United States Patent [19]
Yuen

[11] Patent Number: 6,068,761
[45] Date of Patent: May 30, 2000

[54] LIQUID PURIFICATION SYSTEM

[75] Inventor: Wang Sing Yuen, Hong Kong, China

[73] Assignee: International House of Distinction (HK) Ltd., Hong Kong, China

[21] Appl. No.: 09/138,288

[22] Filed: Aug. 21, 1998

Related U.S. Application Data

[60] Provisional application No. 60/097,316, Aug. 19, 1998.

[51] Int. Cl.[7] .................................................. B01D 35/14
[52] U.S. Cl. .............................. 210/87; 210/91; 210/266; 210/284; 210/418
[58] Field of Search ................................... 210/85, 87, 94, 210/91, 264, 266, 282, 284, 314, 449, 662, 688, 259, 663, 669, 418; 137/551, 553, 559

[56] References Cited

U.S. PATENT DOCUMENTS

| | | |
|---|---|---|
| 1,941,982 | 1/1934 | Gill . |
| 2,337,469 | 12/1943 | Hill . |
| 4,196,081 | 4/1980 | Pavia et al. ............................. 210/284 |
| 4,212,743 | 7/1980 | Van Meter et al. .................... 210/282 |
| 4,382,862 | 5/1983 | Dillman ................................. 210/688 |
| 4,681,677 | 7/1987 | Kuh et al. ................................ 210/91 |
| 4,683,054 | 7/1987 | Turnbull ................................... 210/91 |
| 4,814,078 | 3/1989 | Stern et al. ............................. 210/282 |
| 4,877,521 | 10/1989 | Petrucci et al. ........................ 210/171 |
| 5,061,367 | 10/1991 | Hatch et al. ............................ 210/266 |
| 5,110,479 | 5/1992 | Frommer et al. ...................... 210/662 |
| 5,269,919 | 12/1993 | von Medlin ............................ 210/256 |
| 5,401,399 | 3/1995 | Magnusson et al. ................... 210/136 |
| 5,552,057 | 9/1996 | Hughes et al. .......................... 210/284 |
| 5,562,824 | 10/1996 | Magnusson et al. ................... 210/284 |
| 5,573,665 | 11/1996 | Frommer et al. ...................... 210/266 |
| 5,762,787 | 6/1998 | Park et al. .............................. 210/449 |

Primary Examiner—Joseph W. Drodge
Attorney, Agent, or Firm—Shlesinger, Arkwright & Garvey LLP

[57] ABSTRACT

A liquid purification device comprising an enclosure having a first portion with an inlet and second portion with an outlet; a partition separating the first and second portion; a hydrate sensitive purification medium disposed within the first portion; a second purification medium disposed within the second portion; a first valve disposed adjacent the inlet of the first portion; and, a second valve operably associated with the partition for permitting flow of the liquid from the first portion to the second portion.

12 Claims, 5 Drawing Sheets

LIQUID PURIFICATION SYSTEM

This is a non-provisional continuation application of provisional application 60/097,316 that was filed on Aug. 19, 1998, in the name of Wang Sing Yuen, hereby incorporated by reference.

FIELD OF THE INVENTION

This invention relates generally to liquid purification systems and more particularly to keeping a hydrate sensitive purification medium within a purification system hydrated prior to use of the purification system.

BACKGROUND OF THE INVENTION

Over the years, there have been numerous attempts to filter fluids and in particular, to filter drinking water. Such attempts have included various filtering media, some of which are hydrate sensitive. In other words, some systems have been developed where particular media must be maintained in a hydrated state prior to use in order to maintain the integrity of the purification medium.

Examples of various filtration systems and related devices, are disclosed in U.S. Pat. No. 5,269,919, issued Dec. 14, 1993; U.S. Pat. No. 5,401,399, issued Mar. 28, 1995; U.S. Pat. No. 5,110,479, issued May 5, 1992; U.S. Pat. No. 4,877,521, issued Oct. 31, 1989; U.S. Pat. No. 4,681,677, issued Jul. 21, 1987; U.S. Pat. No. 4,683,054, issued Jul. 28, 1987; U.S. Pat. No. 4,814,078, issued Mar. 21, 1989; U.S. Pat. No. 4,382,862, issued May 10, 1983; U.S. Pat. No. 4,212,743, issued Jul. 15, 1980; U.S. Pat. No. 2,337,469, issued Dec. 21, 1943; and, U.S. Pat. No. 1,941,982, issued Jan. 2, 1934.

However, these attempts have failed to provide a filtration system having a hydrate sensitive filtration medium separate from a non-hydrate sensitive filtration medium, with the hydrate sensitive medium being maintained in a hydrated state prior to use, and the ability to efficiently and easily remove any barriers or seals maintaining the hydrate sensitive medium in a hydrated state and, which provides a tamper-proof indicator.

OBJECTS AND SUMMARY OF THE INVENTION

It is an object of this present invention to provide a liquid purification device, which overcomes the shortcomings of the prior art.

Another object of this present invention is to provide a liquid purification device, which maintains a hydrate sensitive purification medium in a hydrated state prior to use of the device.

Yet another object of this present invention is to provide a liquid purification device, which allows a non-hydrate sensitive filtration medium to be separated from a hydrate sensitive filtration medium.

A further object of this invention is to provide a liquid purification device, which allows for efficient and easy removal of the barriers or seals maintaining a hydrate sensitive purification medium in a hydrated state.

Yet another object of this present invention is to provide a liquid purification device, which provides a tamper-proof indicator, for indicating whether the barriers or seals, maintaining a hydrate sensitive purification medium in a hydrated state have been removed or opened prior to use of the device.

Still a further object of this present invention is to provide a liquid purification device, which provides a safety device for the inadvertent removal or opening of a barrier or seal maintaining a hydrate sensitive purification medium in a hydrated state.

Yet another object of this present invention is to provide a liquid purification device, which is inexpensive to manufacture and maintain.

In summary, the present invention discloses a novel configuration for a liquid purification device, which includes an enclosure having a first portion with an inlet and a second portion with an outlet, a partition separating the first and second portions, a hydrate sensitive purification medium being disposed within the first portion, a second purification medium being disposed with the second portion, a first valve being disposed adjacent the inlet of the first portion, and a second valve operably associated with the partition for permitting flow of the liquid from the first portion to the second portion.

These and other objects of the invention will be apparent from the following detailed description.

DETAILED DESCRIPTION OF THE INVENTION

Figure 1:
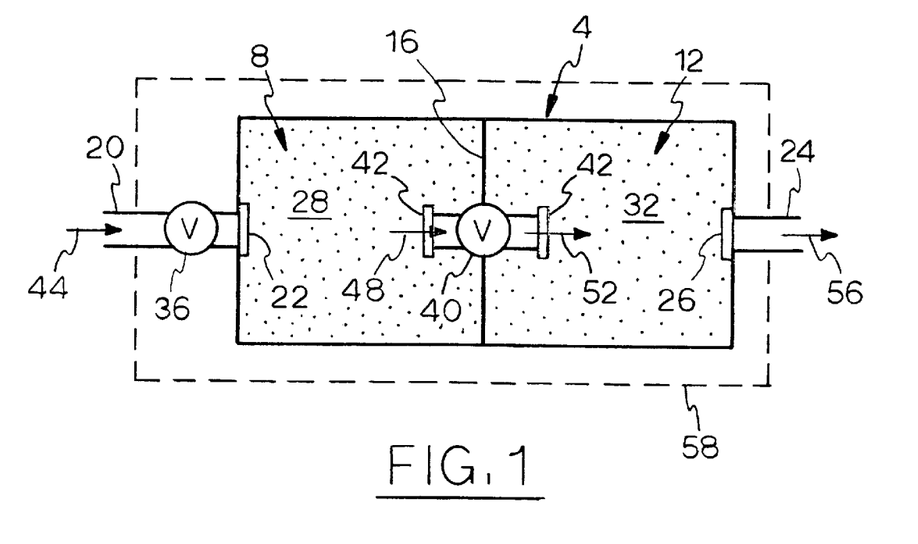
FIG. 1 is a schematic view of a liquid purification device made in accordance with the present invention.

FIG. 1

Shown in FIG. 1, is a liquid purification device A, made in accordance with the present invention. Liquid purification device A comprises an enclosure 4. Enclosure 4 has a first portion or chamber 8 and second portion or chamber 12. First and second portions 8 and 12 are separated by a partition 16. An inlet 20 is provided in first portion 8. An outlet 24 is provided in second portion 12.

A hydrate sensitive purification medium 28 (not shown for clarity) is disposed within first portion 8. A second purification medium 32 (not shown for clarity) is disposed within second portion 12.

A first valve 36 is disposed adjacent inlet 20 for regulating the in-flow of a liquid into first portion 8. A second valve 40 is operably associated with partition 16 for regulating the flow of a liquid from first portion 8 to second portion 12.

For purposes of illustration, arrow 44 is shown to represent the direction of fluid flow through inlet 20. Arrow 48 is shown to represent fluid flow through first portion 8. Arrow 52 is shown to represent fluid flow exiting second valve 40. Arrow 56 is shown to represent fluid flow exiting outlet 24.

Enclosure 4 may be made of many different materials, including, but not limited to, plastic. The configuration of enclosure 4 is cylindrical in nature. However, it is understood, that particular configuration is not required, and numerous different configurations may be utilized.

Inlet 20 and outlet 24 are holes or orifices in enclosure 4. Inlet 20 and outlet 24 are preferred to be at opposite ends of enclosure 4. However, it is understood that inlet 20 and outlet 24 may be disposed in any number of locations within first portion 8 and second portion 12, respectively.

Hydrate sensitive purification medium 28 is a material that overtime will degrade in its ability or effectiveness of purifying liquids. This ability degrades more rapidly when hydrate sensitive purification medium 28 is not maintained in a hydrated state. In other words, hydrate sensitive purification medium 28 must be kept in a moist state prior to use of the filtration device A, such as when it is sitting on a shelf waiting to be used. Accordingly, prior to use, hydrate sensitive purification medium 28 is hydrated. Purification medium 28 is preferably an iodinated resin (preferably a cross linked polystyrene resin, such as MCV-trademark). However, it is understood that any type of hydrate sensitive medium may be utilized. Purification medium 28 is granular in form. Purification medium 28 may alternatively be in various other forms.

Second purification medium 32 is a non-hydrate sensitive purification medium. Purification medium 32 may be of various purification mediums, such as silver carbon, activated carbon or a copper zinc alloy. However, it is understood that any type of non-hydrate sensitive medium may be utilized. Purification medium 32 is granular in form. However, purification medium 32 may also be in various other forms.

Valves 36 and 40 may selectively be in an "opened" position or a "closed" position, to allow the flow of a liquid or to prevent the flow of a liquid, respectively. Depending on the type of the valve used, valves 36 and 40 may be partially opened to limit the flow of a liquid.

To maintain hydrate sensitive purification medium 28 in a hydrated state prior to use, first valve 36 is provided at inlet 20 and second valve 40 is operably associated with partition 16. Prior to use, hydrate sensitive purification medium 28 is hydrated with a liquid. Valves 36 and 40, when closed, prevent the liquid from escaping first portion 8. If second valve 40 is open and second purification medium 32 is carbon based, second purification medium 32 will tend to wick the liquid from hydrate sensitive purification medium 28.

When a user is ready to use device A, first and second valves 36 and 40, are placed in an open position so that a liquid will pass through inlet 20; then pass through first portion 8 and hydrate sensitive purification medium 28; through second valve 40; second portion 12 and second purification medium 32; and, through outlet 24. This flow is shown by arrows 44, 48, 52 and 56.

If hydrate sensitive purification medium 28 is in granular form, an inlet screen 22 is provided adjacent inlet 20. Likewise, if second purification medium 32 is of a granular form, an outlet screen 26 is provided adjacent outlet 24 to provide granulars from escaping outlet 24. Similarly, if hydrate sensitive purification medium 28 and second purification medium 32 are granular in form, second valve screens 42, disposed adjacent second valve 40, are provided to prevent granules from entering into second valve 40. Screen 22, 26, and 40 allow for the passage of a liquid but not particles. Screens 22, 26, and 42 are made of a non-woven material. Screens 22, 26 and 42 may alternatively be of many other numerous forms, such as, but not limited to, metal or plastic mesh screens.

Figure 2:
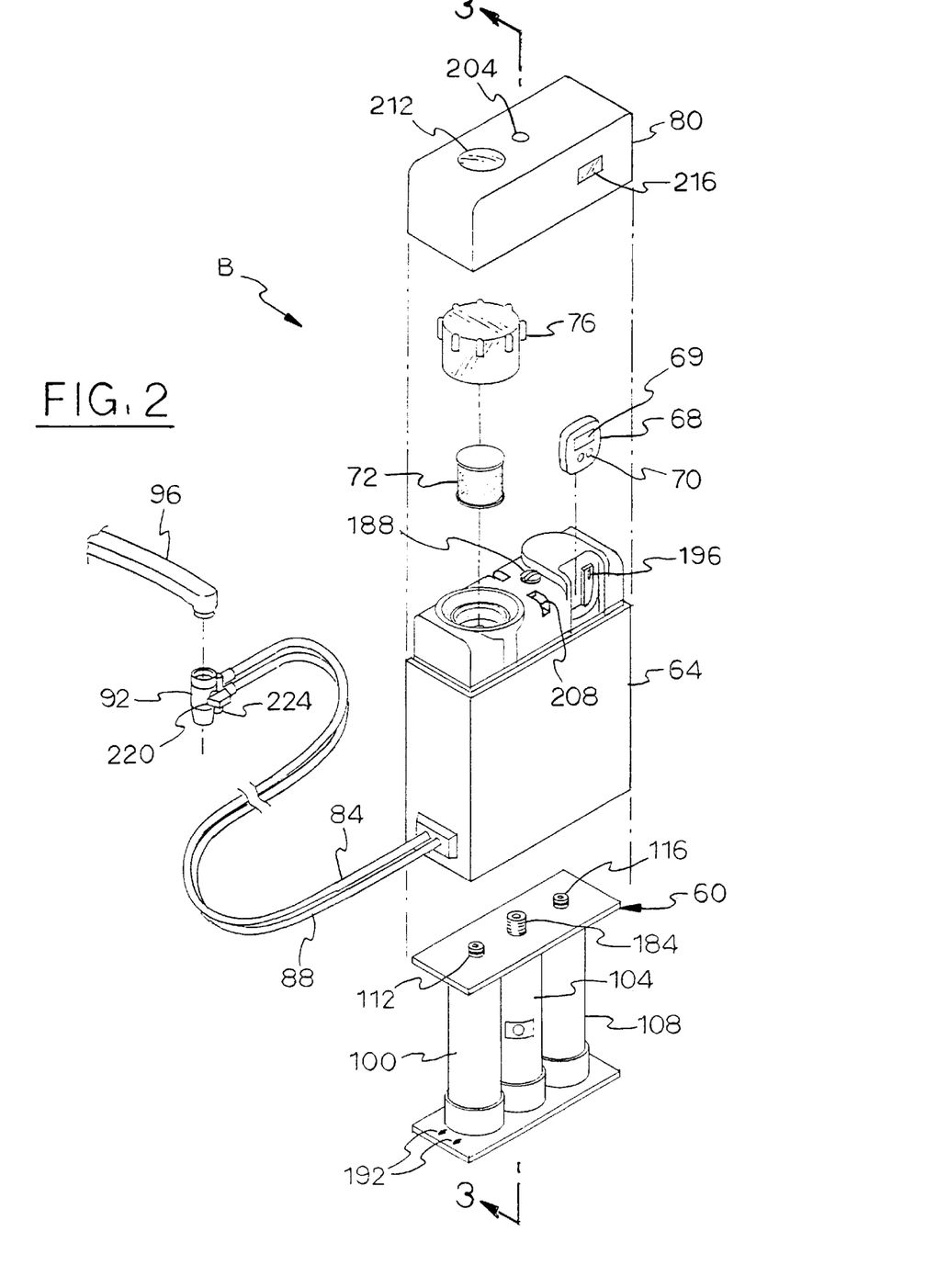
FIG. 2 is an exploded isometric view of an alternative embodiment of a liquid purification device made in accordance with the present invention.
Figure 4:
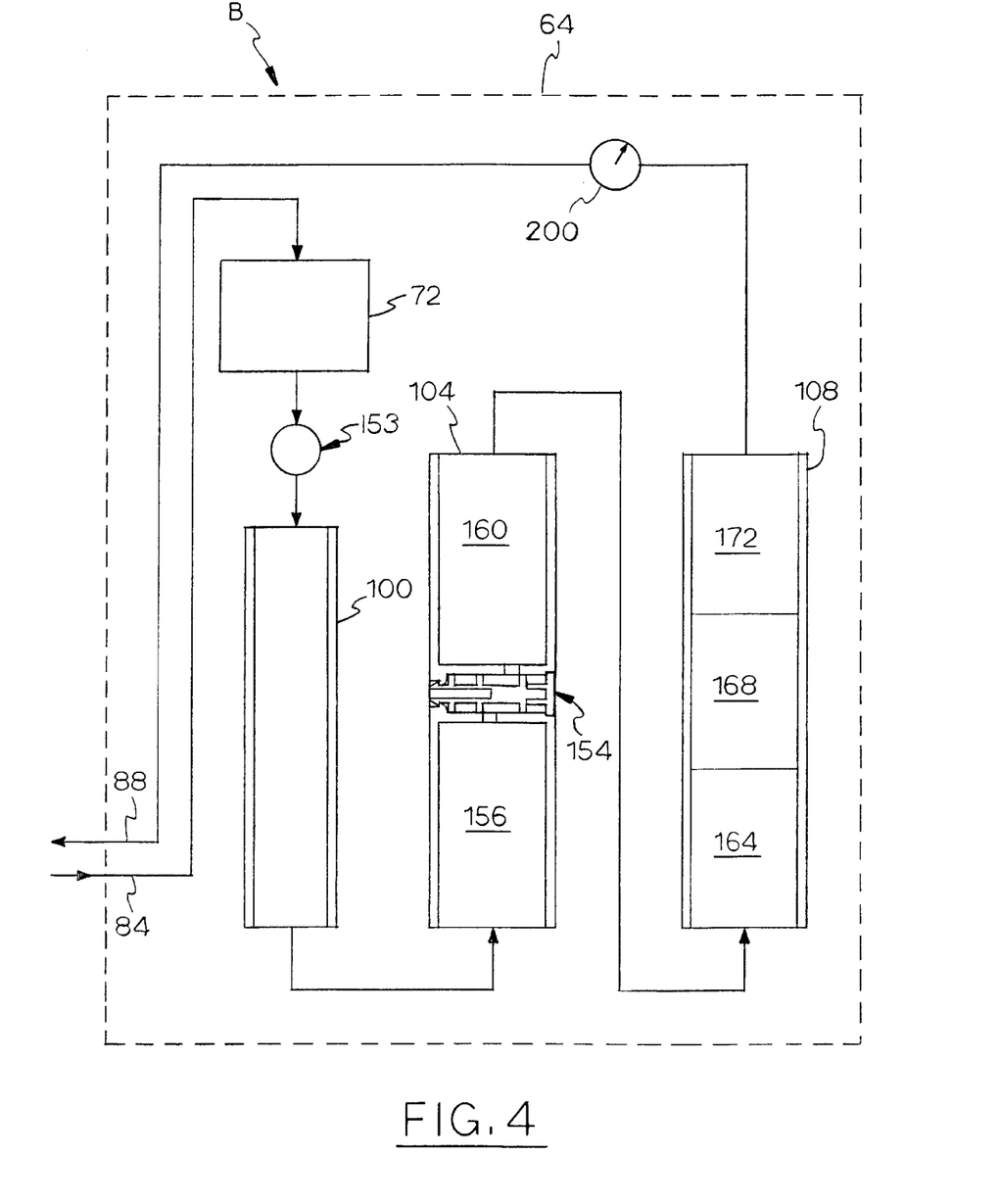
FIG. 4 is a schematic view of the liquid purification device of FIG. 2.

First valve 36 is a plug. First valve 36 may alternatively be a seal; a removable seal; a puncturable seal; a puncturable membrane; a conventional fluid valve; or any device that regulates the flow of liquid by blocking and opening inlet 20. Second valve 40 is a slidable valve. Second valve 40 may also be a conventional fluid valve or any other device that regulates the flow of liquids by blocking and opening the passage way between first portion 8 and second portion 12. For further discussion regarding specific types of valves for valves 36 and 40, see discussion below regarding valves 153 and 154, (FIG. 4) respectively, of an alternative embodiment, namely, of liquid purification device B (FIGS. 2 and 4).

With second valve 40 as a push valve, a user will be able to determine if device A has been tampered with, namely, whether second valve 40 has been opened and thus allowing the moisture to escape from medium 28, prior to use. Push valves are discussed further below.

The liquid being filtered is preferred to be water. Further, the liquid is preferred to be tap water. As discussed above, with first valve 36 and second valve 40 in closed positions, hydrate sensitive purification medium 28 will remain in a hydrated state until valve 36 and/or 40 are opened. With this arrangement, the "shelf-life" of the liquid purification device A, is increased.

To prevent the inadvertent opening of first valve 36 and second valve 40, a cover or outer housing 58 (shown in phantom lines) is disposed about enclosure 4. Cover 58 is plastic. Alternatively, cover 58 may be made of other various materials.

Figure 3:
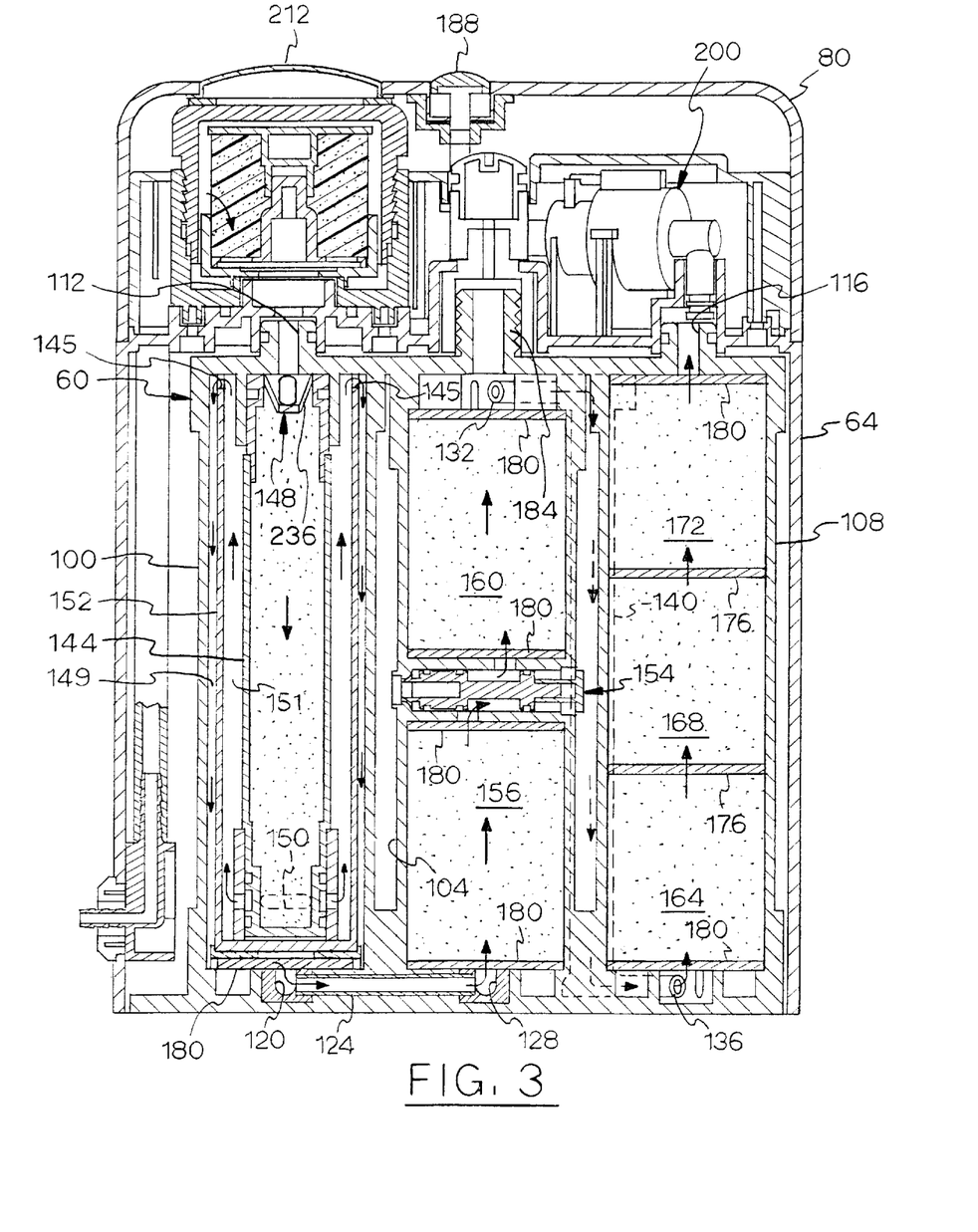
FIG. 3 is a cross sectional view of the liquid purification system of FIG. 2 taken along line 3—3 in FIG. 2.

FIGS. 2, 3 AND 4

Displayed in FIG. 2 is a liquid purification device B, an alternative embodiment, made in accordance with the present invention. Device B includes a canister unit 60. Covering the canister unit 60 is a main housing body or a canister unit cover 64. Disposed on and operably engaged with housing body 64 is a flow or filtration meter display 68. Device B also includes a pre-filter 72, which is disposed adjacent housing body 64. Device B also includes a cap or a protective case 76, which is operably engaged with main housing body 64. Device B further includes a main housing cover 80. A liquid inlet tube 84 and a liquid outlet tube 88 are attached to main housing body 64. Attached at the terminal ends of inlet tube 84 and outlet tube 88 is a fitting 92. Fitting 92 is operably adapted to engage a common household faucet 96.

Canister unit 60 is comprised of three canisters, namely a first canister 100, a second canister 104 and a third canister 108. A canister unit inlet 112 is provided at the top of first canister 100. A canister unit outlet 116 is provided at the top of third canister 108. A liquid will enter through canister unit inlet 112 and exit canister unit 60 through canister unit outlet 116.

The liquid is preferred to be water. The liquid is further preferred to be tap water.

Displayed in FIG. 3 are arrows representing the flow of the liquid through canister unit 60. The liquid flows through first canister 100 and exits at aperture 120 of first canister 100. The liquid then flows through a channel 124 that is within canister unit 60, to an inlet 128 for second canister 104. The liquid flows through the second canister 104 to an exit aperture 132. Exit aperture 132 is connected to an inlet 136 for third canister unit 108 by a connecting tube 140. Connecting tube 140 and the arrow illustrating the flow through connecting tube 140, are shown in hidden lines. The liquid passes through third canister 108 and exits through canister unit 60 at canister unit outlet 116. The means by which the liquid travels from faucet 92 to canister inlet 112 and from canister unit outlet 116, will be discussed further below.

Provided within each canister, namely, first canister 100, second canister 104 and third canister 108, are various filtering media. Some filtering media is best stored in a moist state or a hydrated state, (i.e. hydrate sensitive), while other filtering media is best stored in a dry or non-hydrated state (i.e. non-hydrate sensitive). Examples of a hydrate sensitive media are MCV (trademark) and IDOSORB (trademark). Activated carbon is an example of a non-hydrate sensitive media. If the hydrate sensitive material is not kept in a hydrated state prior to use, its effectiveness will degrade or become inactive with time.

Within first canister 100 is a cartridge 144 that contains a hydrate sensitive medium. It is preferred that cartridge 144 contain MCV, (Microbial Check Valve), (trademark), which is an iodinated resin, namely, cross-linked polystyrene resin. This medium kills bacteria.

At the top of cartridge 144 is a cap of flow control member 148, which will be discussed further below. Cap 148 is disposed adjacent canister inlet 112. Near first canister exit aperture 120 is an aperture 150 in cartridge 144. Fluid flows through aperture 150 into chamber 151, which is formed by canister 152 enclosing cartridge 144. The fluid exits an opening 145 and flows through a chamber 149, which is formed by first canister 100 and canister 152, to exit aperture 120.

The total volume of chambers 149 and 151 is greater than the volume of cartridge 144. The amount of time for the liquid to flow through chambers 149 and 151 will be greater than the amount of time for the liquid to flow through cartridge 144. The liquid travels through chambers 149 and 151 to provide additional time for the filtration medium to kill bacteria in the liquid.

The total volume of chambers 149 and 151 is preferred to be about two to about twenty times greater than the volume of cartridge 144. It is further preferred that the total volume of chambers 149 and 151 be about five to about ten times greater than the volume of cartridge 144. It is further preferred that the total volume of chambers 149 and 151 be about five times greater than the volume of cartridge 144. The time for the liquid to travel through chambers 149 and 151 will increase as the volume of chambers 149 and 151 is increased.

Disposed at canister unit inlet 112 is a first valve 153 (FIG. 4), (not shown in FIG. 3). First valve 153 will be discussed further below.

Second canister 104 is separated in two portions, a first portion 160 and a second portion 164 by a second valve 154. Second valve 154 will be discussed further below.

Disposed within first portion 156 is a hydrate sensitive purification medium. This medium may be any type of hydrate sensitive purification medium. This medium is preferred to be IDOSORB (trademark). The medium with first portion 156 is preferred to be in granular form. However, this medium may be of any form.

Stored within second portion 160 is a non-hydrate sensitive purification medium. The filtration medium disposed within second portion 160 is preferred to be silver carbon or activated carbon. Further, the filtration medium disposed within second portion 160 is preferred to be in granular form. However, this medium may be of any form.

Disposed within third canister 108 is a non-hydrate sensitive purification medium. Third canister 108 is preferred to be divided into three sections, namely, a first section 164, a second section 168 and a third section 172.

Disposed within first section 164 is a silver carbon or activated carbon filtration medium. Disposed within second section 168 is a zinc copper alloy or a multi-element alloy filtration medium, such as KDF. Disposed within third section 172 is activated carbon.

The filtration medium disposed within third canister 108 is preferred to be granular in form. However, these media may be of any form. Separating the three sections, namely, first section 164, second section 168 and third section 172, are screens or filters 176. Screens 176 are preferred to be of a non-woven material.

Disposed adjacent exit aperture 120, inlet 128, exit aperture 132, inlet 136 and canister unit outlet 116 are screens or filters 180. Screens 180 are preferred to be of a non-woven material.

Screens 176 and 180 may alternatively be, but not limited to metal or plastic mesh screens.

FIG. 4 represents a schematic diagram of the liquid flow through device B. The flow of the liquid is illustrated by the plurality of arrows. Liquid flows from faucet 96 (FIG. 2) through inlet tube 84, through main housing body 64 and into pre-filter 72. Pre-filter 72 is preferred to be of a high density polypropylene material.

Disposed between pre-filter 72 and first canister 100 is first valve 153. First valve 153 may selectively be in a closed position or an opened position. While in an opened position, liquid will flow freely from pre-filter 72 to first canister 100.

Liquid flows from first canister 100 to second canister 104. Separating first portion 156 and second portion 160 of second canister 104, is second valve 154. Second valve 154 may selectively be in a closed or opened position. Second valve 154 is shown in a partially opened position in FIG. 3. While in an opened position, liquid may flow freely from first portion 156 to second portion 160. From second canister 104, the liquid will travel to first section 164 of third canister 108. The liquid will then flow through second section 168 and third section 172 of third canister 108. Upon exiting third canister 108, a liquid will flow through a flow meter device 200 and subsequently out of device B through outlet tube 88.

As noted above, the filtration media disposed in second portion 160 and in third canister 108 are non-hydrate sensitive. The filtration media disposed in first canister 100 and first portion 156 of second canister 104, are hydrate sensitive. Second valve 154 separates or partitions the non-hydrate sensitive materials from the hydrate sensitive materials.

Prior to use, the hydrate sensitive materials disposed within first canister 100 and first portion 156 are pre-moistened or pre-hydrated. To maintain this hydrated state prior to use, first valve 153 and second valve 154 are in their closed positions. With this arrangement, moisture or water disposed in first canister 100 and first portion 156 will not escape. If first valve 153 is in an opened position, water or moisture may leak out. If second valve 154 was in an opened position, the non-hydrate sensitive filtration media disposed downstream from the hydrate sensitive filtration media may wick the moisture from the hydrate sensitive medium or the moisture may leak out.

Just prior to use of device B, a user will open first valve 153 and second valve 154, thereby allowing the free flow of water through canister unit 60. To prevent the inadvertent opening or activation of first valve 153 and second valve 154, main body housing 64 is provided over valves 153 and 154. To activate valves 153 and 154, housing 64 must be removed.

To attach housing 64 to canister unit 60, a threaded shank portion 184 (FIG. 2) is provided on canister unit 60 for operable engagement with a rotatable nut or locking device 188, which is disposed on housing 64. Locking device 188 is adapted so that it may be turned or rotated from the outside of housing 64 with a standard screw driver or a coin. Upon placing housing 64 on canister unit 60 and the rotation of locking device 188, housing 64 will secure itself to canister unit 60.

To ensure that housing 64 is properly aligned with canister unit 60, alignment arrows 192 (FIG. 2) are provided on canister unit 60. Corresponding alignment arrows (not shown) are disposed on the corresponding portion of housing 64.

Filtration meter display 68 (FIG. 2) attaches to housing 64. Filtration meter display 68 is a common meter display that is commercially available. Filtration meter display 68 may be battery removed. Filtration meter display 68 has an electronic display 69 and function control buttons 70 on one of its sides. The reverse side of filtration meter display 68 contains electrical contacts (not shown). These contacts operably engage electrical contacts 196 disposed on housing 64. Electrical contacts 196 receive a signal from a flow meter device 200 (FIG. 4) disposed within housing 64. Flow meter device 200 measures various properties of fluid flow, such as the flow rate and the volume of liquid that has been filtered. Flow meter device 200 sends an electrical signal to electrical contacts 196, which in turn sends a signal to filtration meter display 68 so that the user can visually see fluid flow information.

After flowing through meter device 200, the liquid flows through channels or conduits in housing 64 to outlet tube 88.

Cap 76 operably engages housing 64. Cap 76 is preferred to have a threaded portion that engages a corresponding threaded portion of housing 64. Cap 76 prevents water that is travelling through and around pre-filter 72 from escaping device B. Cap 76 is preferred to be transparent so that a user can visually determine if pre-filter 72 needs to be replaced. Pre-filter 72 needs to be replaced when it becomes dirty or clogged.

Main housing cover 80 is secured to housing 64 with a latching means, which includes a releasing button 204 that is disposed in main housing cover 80. Releasing button 204 activates claws or clasps (not shown) that engage recesses 208, which are formed within the top portion of housing 64.

Main housing cover 80 also includes a viewing piece 212. Viewing piece 212 is preferred to be transparent to allow a user to view pre-filter 72. Main housing cover 80 also includes a meter viewing piece 216. Meter viewing piece 216 is preferred to be transparent. Meter viewing piece 216 is disposed on main housing cover 80 to allow a user to view filtration meter display 68.

Inlet tube 84 and outlet tube 88 are common flexible plumbing tubes. Fitting 92 is operably adapted to engage a common household faucet 96. Fitting 92 is provided with a handle 220. Handle 220 is rotatable. The rotation of handle 220 dictates whether fluid flow from faucet 96 will simply exit through fitting 92 and not enter device B, or whether fluid exiting faucet 96 will enter device B through inlet tube 84. If handle 220 is rotated by user to allow fluid exiting faucet 96 to enter device B, the filtered fluid departing device B through outlet tube 88 will be dispensed through outlet 224 of fitting 92.

FIGS. 5, 6, 7, 8 AND 9

Figures 5, 6, 7:
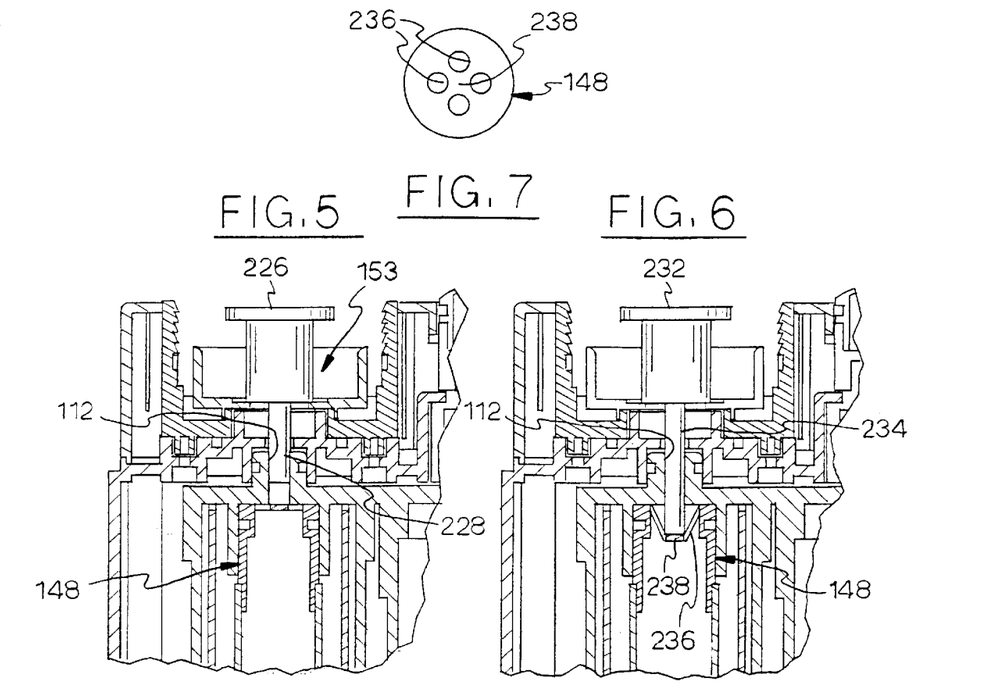
FIG. 5 is a detailed view of the first valve of the liquid purification device of FIG. 2, shown with the valve in a closed position.
FIG. 6 is a detailed view of the canister unit inlet of the liquid purification device of FIG. 2, shown with a cap extending tool.
FIG. 7 is a top view of a cap of the liquid purification device of FIG. 7.

FIG. 5 displays first valve 153. First valve 153 is adapted to selectively allow or disallow fluid flow through canister unit inlet 112. First valve 153, as shown in FIG. 5, is a plug having a shaft portion 228, which snugly fits and seals inlet 112. When the user desires to open first valve 153, plug 226 is removed. Plug 226 may be removed by the user by simply pulling plug 226 until shaft 228 is free from inlet 112. Shaft 228 is at a length that does not extend to reach cap 148.

Shown in FIG. 6 is a cap extending tool or detent tool 232. Cap extending tool 232 is inserted canister unit inlet 112 to extend cap 148. Cap extending tool 232 has a shaft portion 234 that extends through inlet 112, and deforms, extends or bends cap 148. After extending cap 148, tool 232 is removed. Cap 148 is extended or bent by tool 232 to allow for increased flow of the liquid through first canister 100.

FIG. 7 shows cap 148. Cap 148 is preferred to be provided with perforations 236, which are equally spaced about cap 148. Perforations 236 facilitate the extension of cap 148. A center portion 238 of cap 148 aids plug 226 in sealing inlet 112 by substantially engaging and covering inlet 112, prior to extension of cap 148.

Figure 8:
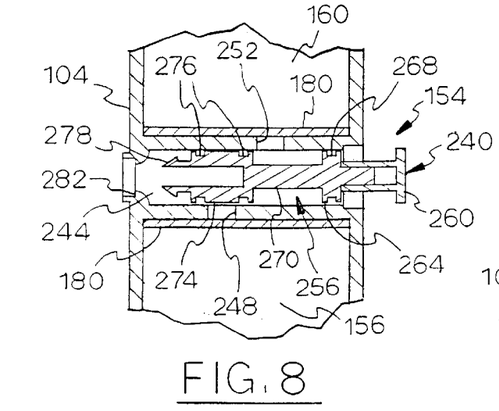
FIG. 8 is a detailed view of a second valve of the liquid purification device of FIG. 2, shown in a closed position.
Figure 9:
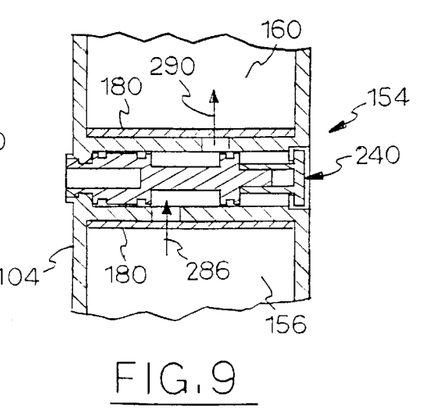
FIG. 9 is a detailed view of the second valve of the liquid purification device of FIG. 2, shown in an open position.

Referring to FIGS. 8 and 9, second valve 154 is displayed. Second valve 154 may be in a closed position or an opened position. Second valve 154 separates first portion 156 and second portion 160 of second canister 104.

Second valve 154 is a one way tamper proof push valve 240. Push valve 240 includes a valve chamber 244. Valve chamber 244 partitions first portion 156 and second portion 160. First portion 156 is provided with exit aperture 248, which permits communication between valve chamber 244 and first portion 156. Second portion 160 is provided with an inlet aperture 252, which permits communication between second portion 160 and valve chamber 244.

Disposed within valve chamber 244 is a valve poppet 256. Valve poppet 256 is provided with a button 260 on its terminal end, which extends out from valve chamber 244. Valve poppet 256 is also provided with a first shoulder 264, a shank portion 270, a second shoulder 274 and a plurality of clasps or fingers. Shank portion 270 is disposed between first shoulder 264 and second shoulder 274. Disposed at the opposite end from button 260 and adjacent second shoulder 274 are clasps or prongs 278. First shoulder 264 and second shoulder 274 are of a diameter that is substantially the same or slightly less than the inside diameter of valve chamber 244.

First shoulder 264 has an annular recess 268. Second shoulder 274, has annular recesses 276. Recesses 268 and 276 are operably adapted to receive o-rings, (not shown), to provide a seal and prevent liquid from leaking. The o-rings may be made of numerous materials, such as, but not limited to, rubber or plastic.

Clasps 278 operably engage a locking portion 282 of valve chamber 244. In other words, clasps 278 have a profile that allow clasps 278 to easily, with minimal effort, slide into locking portion 282. Once in locking portion 282, clasps 278 are adapted to prevent clasps 278 from exiting locking portion 282. With clasps 278 locked in locking portion 282, valve poppet 256 will not be able to translate within valve chamber 244.

FIG. 8 displays second valve 154 in a closed position. In this closed position, second shoulder 274 is disposed adjacent exit aperture 248, preventing fluid from entering valve chamber 244.

FIG. 9 shows second valve 154 in an opened position. In this position, valve poppet 256 has been displaced or translated within valve chamber 244 so that second shoulder 274 is not disposed adjacent exit aperture 248. Arrows 286 and 290 show, generally, the direction of liquid flow from first portion 156 through exit aperture 248, around shank portion 270 and through inlet aperture 252 into second portion 160.

To open push valve 240, a user will push button 260 which will in turn translate valve poppet 256 through valve chamber 244.

When push valve 240 is in a closed position, (FIG. 8), button 260 extends away from the outer wall of second canister 104. This extension away from second canister 104 is visibly noticeable by a user.

When push valve 240 is in the opened position, (FIG. 9), button 260 is at least flush with the outer wall of second canister 104.

With this arrangement, whereby button 260 extends away from second canister 104 when push valve 240 is closed and is at least flush with second canister 104 when opened, the user may readily ascertain whether push valve 240 is in a closed or open position. This arrangement also provides a user with a tamper-proof indicator. If a user intends to use a filtration device for the first time, but ascertains that button 260 is flush with second canister 104, then the user will readily understand that push valve 240 is open and the maintenance of the hydrate sensitive material disposed within first portion 156 and first canister 100 in a hydrate state has been compromised.

When the user plans to use device B for the first time, the user will pull plug 226 and push button 260 to open first valve 153 and second valve 154, respectively, to allow the free flow of liquid through canister 60.

Note, in FIGS. 4, 5, 6, 8 and 9, the various filtering media have not been shown for clarity purposes. Furthermore, in FIG. 3, the various filtering media have been shown to substantially occupy their respective compartments. However, it is understood that for the operation of this invention, the various filtering media need not completely or substantially occupy their respective compartments.

While this invention has been described as having a preferred design, it is understood that it is capable of further modification, uses and/or adaptations following in general the principles of the invention and including such departures from the present disclosure as come within known or customary practice in the art to which the invention pertains, and as may be applied to the essential features set forth, and fall within the scope of the invention or the limits of the appended claims.

What is claimed is:

1. A tamper-proof liquid purification device comprising:
   a) an enclosure having a first portion for receiving a hydrate sensitive purification medium;
   b) said first portion having an inlet;
   c) said enclosure having a second portion for receiving a non-hydrate sensitive filtration medium;
   d) said second portion having an outlet;
   e) a partition separating said first and second portions;
   f) said inlet having a first deformable valve having a first undeformed position preventing flow of liquid into said first portion and a second deformed position permitting flow of fluid into said first portion;
   g) said partition having a movable second valve connecting said first portion with said second portion;
   h) said movable second valve having an unlocked position preventing flow of liquid from said first portion to said second portion;
   i) said movable second valve having a locked position permitting flow of liquid from said first portion to said second portion;
   j) said second movable valve having a visible portion indicating unlocked and locked positions;
   k) whereby hydrate sensitive purification medium when in said first portion will remain hydrated until said first valve is deformed and said second movable valve is moved to said locked position.

2. A tamper-proof liquid purification device as in claim 1 and wherein:
   a) said first deformable valve includes a deformable cap having at least one perforation which is blocked when said first deformable valve is in said first undeformed position, and which said at least one perforation is unblocked when said first deformable valve is in said second deformed position.

3. A tamper-proof liquid purification device as in claim 1 and wherein:
   a) said second movable valve is a push-valve having a visible push-button having visible unlocked and locked positions.

4. A tamper-proof liquid purification device as in claim 1 and including:
   a) a removable housing body surrounding said enclosure for protecting said second movable valve from accidental movement.

5. A tamper-proof liquid purification device as in claim 4 and including:
   a) a flow meter display on said housing.

6. A tamper-proof liquid purification device as in claim 4 and wherein:
   a) said enclosure includes three canisters.

7. A tamper-proof liquid purification device as in claim 6 and wherein:
   a) said three canisters include a first hydrate canister, a second hydrate and non-hydrate canister, and a third non-hydrate canister.

8. A tamper-proof liquid purification device as in claim 7 and wherein:
   a) said second hydrate and non-hydrate canister includes said second movable valve.

9. A tamper-proof liquid purification device as in claim 8 and wherein:
   a) said inlet includes a pre-filter.

10. A tamper-proof liquid purification device as in claim 9 and including:
    a) a removable cap for said removable housing body.

11. A tamper-proof liquid purification device as in claim 10 and including:
    a) plunger deformer for said first deformable valve.

12. A tamper-proof liquid purification device as in claim 11 and wherein:
    a) said first hydrate canister includes a plurality of concentric chambers mounted below said pre-filter and under said cap.

* * * * *